(12) United States Patent
Lindstrom

(10) Patent No.: US 7,337,038 B2
(45) Date of Patent: Feb. 26, 2008

(54) METHOD OF DETERMINING COMPATIBILITY OF TOOL AND WORKSHEET IN A SHEET FABRICATION MACHINE AND SYSTEM THEREFOR

(75) Inventor: Mikko Lindstrom, Geneva, IL (US)

(73) Assignee: Finn-Power International, Inc., Arlington Heights, IL (US)

( * ) Notice: Subject to any disclaimer, the term of this patent is extended or adjusted under 35 U.S.C. 154(b) by 0 days.

(21) Appl. No.: 11/363,212

(22) Filed: Feb. 28, 2006

(65) Prior Publication Data
US 2007/0203611 A1 Aug. 30, 2007

(51) Int. Cl.
*G06F 19/00* (2006.01)
(52) U.S. Cl. ................ 700/175; 700/177; 700/179
(58) Field of Classification Search ............... 700/164, 700/175, 177, 179
See application file for complete search history.

(56) References Cited

U.S. PATENT DOCUMENTS 4,616,322 A * 10/1986 Niwa et al. ............... 700/179

5,485,391 A * 1/1996 Lindstrom ............... 700/175

* cited by examiner

*Primary Examiner*—Ryan A. Jarrett
(74) *Attorney, Agent, or Firm*—Louis Woo

(57) ABSTRACT

To determine whether a tool may be used successfully to fabricate a worksheet in a sheet fabrication machine, data relating to all tools that may be used for the machine as provided by the manufacturers of those tools are stored in a tool database. Dimensional data and characteristics of the worksheets that may be used by the machine are stored in a worksheet database. When a given worksheet is to be fabricated, a determination is made on whether a tool is usable for fabricating that worksheet without causing possible damage to the worksheet, the tool and its die, and/or the machine. The grind life remaining for the tool is used to determine whether the proper clearance between the tool and its die is obtainable by using the tool on the given worksheet. If it is determined that the tool is not useable for a given worksheet, the tool is flagged and reserved for use on worksheets that have a material thickness that is thinner than that of the given worksheet. An appropriate tool that does provide the proper clearance and has the appropriate grind life remaining is then selected for working on the given worksheet.

23 Claims, 7 Drawing Sheets

| Tool # | X | Y | Z | Other fields | Die 1 | Die 2 | Die 3 | ... | Manufacturer | Grind remain |
|---|---|---|---|---|---|---|---|---|---|---|
| 1 | 0.50 | 0.50 | 0 | .... | 0.01 | 0.02 | 0.05 | | Mate | 0.175 |
| 2 | 0.60 | 0.40 | 0 | | 0.01 | 0.02 | 0.05 | | M2 | 0.200 |
| 3 | 3X | 3Y | 3Z | | 3D1 | 3D2 | 3D3 | | M3 | 0.030 |
| 4 | 4X | 4Y | 4Z | | 4D1 | 4D2 | 4D3 | | M4 | 0.040 |
| 5 | 5X | 5Y | 5Z | | 5D1 | 5D2 | 5D3 | | M5 | 0.050 |

FIG. 5

METHOD OF DETERMINING COMPATIBILITY OF TOOL AND WORKSHEET IN A SHEET FABRICATION MACHINE AND SYSTEM THEREFOR

FIELD OF THE INVENTION

The present invention relates to processes in a sheet fabrication environment and more particularly relates to a process and a system therefor of determining whether a tool has sufficient grind life for fabricating any given worksheet.

BACKGROUND OF THE INVENTION

In a sheet fabrication environment, worksheets of different dimensions are fabricated at sheet fabrication machines by different types of tools into myriad shapes and forms. A plurality of tools of different styles and sizes are used on the different types of worksheets. There are moreover a number of different manufacturers that manufacture the different types and styles of tools for the different sheet fabrication machines. Oftentimes, for a particular sheet fabrication machine, for example a turret punch press, different tools are used on a particular worksheet or different worksheets, which may have different dimensions, hardness and thickness.

For the different types of tools, which may include tools that are of different sizes, the grind life for each of the tools may be different from the other tools. In fact, tools that allegedly are the same, both in style and designated specification, may in fact have different grind lives, depending on which manufacturer produced that tool.

The operators who use the tools in a sheet fabrication machine have to be aware of the limitations of the various tools, and are assumed to be knowledgeable with respect to the remaining life of each particular tool that is to be used in the machine. Where a tool has been grounded too close to the end of its grind life, it may not be a good idea to use that tool for thicker worksheets. For if the tool were to be used to fabricate a worksheet having a thickness that is greater than what the tool is capable of punching, not only will the tool not penetrate the worksheet, the thickness of the material would cause the tool to bottom into itself so that it would damage its tool holder, or in a worst case scenario causing substantial damage to both the tool holder and the machine.

To prevent such potential damage, conventionally, the monitoring and the calculating of the usefulness of each tool is left in the hands of the operator. In most instances, if not all of the time, an operator would no longer use a tool well before the tool gets to the end of its useful life, so as to be "on the safe side". Since tools are expensive and a great number of tools may be used for a given period, there is a lot of waste, both in terms of the scrapping of tools that continue to have good grind lives, and the expense of having the operator frequently replacing the tools. The cost for replacing tools annually for a sheet fabrication machine oftentimes may be in excess of $50,000.

SUMMARY OF THE PRESENT INVENTION

To minimize damage to the tool, the worksheet and the machine, the computerized controller of the machine of the instant invention is programmed to look at the dimension of the worksheet, in particular the thickness thereof, and the grind life remaining on the tool that tentatively has been selected for fabricating the worksheet, so as to determine whether the grind life remaining on the tool is adequate to fabricate the worksheet without causing the above-noted damages. Since a sheet fabrication machine, such as for example a turret punch press, typically requires the use of 8 multiple tools, and the tools may be made from different manufacturers and/or have different tolerances and grind lives, a tool database is established in the memory store of the controller of the machine to collect the different data relating to the different tools provided by the manufacturers. Input means in the forms of keyboards, disks and other types of input devices are used to input additional information, or update the data relating to each of the tools into the tool database.

One set of data that is input into the tool database is the respective grind lives of the different tools, as published by the manufacturers, and also as measured by either the operator or sensed automatically by a sensor when the tool is used by the machine. Other information input to the tool database for the different tools may include the respective hovering height for the tools which would provide an indication of the clearance between a tool and the die to be used therewith.

Also established in the memory of the controller is a worksheet database into which data relating to the different dimensions of the various types of worksheets that may be used in the machine are input. Also input to the worksheet database are other data relating to the worksheets including for example the thickness, hardness and other characteristics of the worksheets that are provided by the manufacturers and or measured and input by the operators.

When a particular worksheet is positioned at the machine for processing, information relating to the tool tentatively selected for fabricating the worksheet including the grind life of the tool is retrieved from the tool database and compared with the characteristics, including for example the thickness of the worksheet retrieved from the worksheet database. Depending on the determined required clearance for the tool and its die, the controller will make a decision on whether the tool selected for fabricating the worksheet is acceptable. Where it is determined that the tool does not have sufficient grind life to adequately fabricate the worksheet, the tool is replaced by another tool with the same required dimensions as the being replaced tool but with the requisite grind life necessary to successfully fabricate the worksheet without causing any damages.

In the meanwhile, the tool that is replaced is further analyzed to determine whether the grind life remaining on that tool is adequate or sufficient to fabricate thinner worksheets or worksheets with characteristics less stringent than the being fabricated worksheet. If it is found that there is sufficient remaining grind life in the replaced tool, that information is input to the tool database to update the information for the replaced tool, so that the replaced tool may be used for other worksheets, thereby prolonging the usage of that tool, i.e., extending the useful life of that tool.

The instant invention relates to a method of determining whether a tool can be used to work on worksheets of different thicknesses in a processor control sheet fabrication machine. The method includes the steps of storing in a tool database the respective manufacturer designated grind lives for the tools to be used by the machine, storing in a worksheet database the respective dimensions of the worksheets to be fabricated by the machine, updating the grind life remaining on each tool in the tool database after usage of each tool, retrieving data relating to each tool from the tool database and retrieving data relating to the worksheet from the worksheet database when a worksheet is to be worked on by a tool, and determining from the retrieved tool and worksheet data whether the grind life remaining on a given tool would allow that tool to fabricate the worksheet.

The instant invention further includes a method of choosing an appropriate tool to work on a worksheet without causing damage to either the tool or the worksheet. The method includes storing in a tool database the respective manufacturer designated grind lives of the tools to be used with the machine, the updating of the grind life remaining on each tool to the tool database after usage of each of the tools, the retrieving of data relating to the respective grind lives of the tools from the tool database and determining from the retrieved data whether there is at least one tool having a grind life remaining that would successfully fabricate the worksheet without causing damage to the tool and/or the worksheet, and if such tool is available then selecting the available tool to fabricate the worksheet.

The instant invention further relates to a sheet fabrication machine that has a plurality of worksheets, a plurality of tools each adapted to be used by the machine to fabricate selected worksheets, a tool database for storing at least the respective manufacturer designated grind lives for the tools, a worksheet database for storing at least the respective material thicknesses of the worksheets, and a processor for determining from the data stored in the worksheet and tool databases whether a tool selected for fabricating a worksheet of a given material thickness has a grind life remaining that would enable the tool to successfully fabricate the worksheet.

Other aspects of the invention include flagging a tool if that tool is determinant not to be usable for a given worksheet, but reserving the tool for use for worksheets that are thinner than the given worksheets so that the useful life the tool is extended.

With the inventive methods, and system therefor, the cost of replacing tools in a sheet fabrication machine is substantially reduced. Moreover, damages that might otherwise occur are reduced, if not totally eliminated.

BRIEF DESCRIPTION OF THE FIGURES

The present invention will become more apparent and the invention itself will be best understood by reference to the following description of an embodiment of the invention take in conjunction with the following drawings, wherein:

FIG. 5 is an exemplar listing of information for a number of tools stored in the tool database of the instant invention apparatus.

DETAILED DESCRIPTION OF THE PRESENT INVENTION

Figure 1:
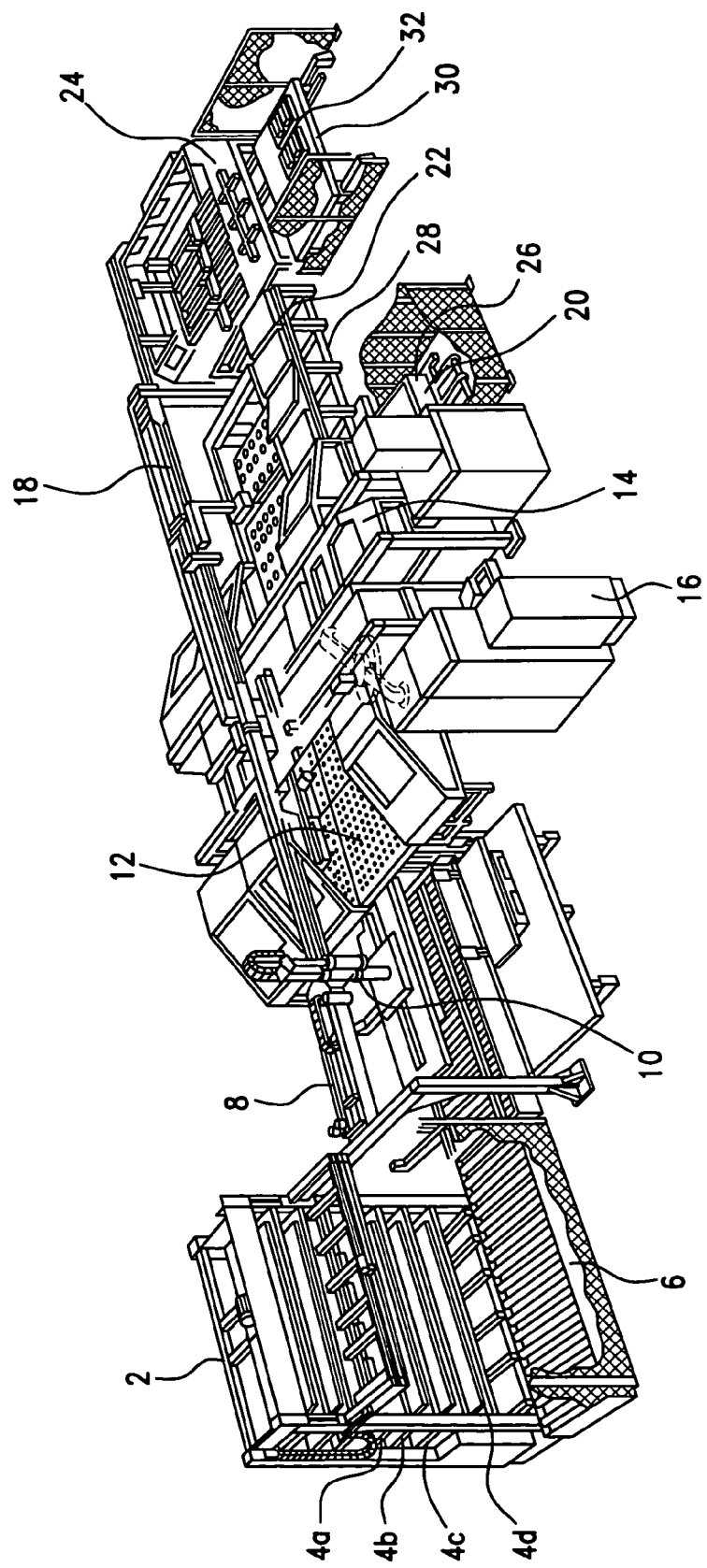
FIG. 1 illustrates a flexible manufacturing system that includes a number of sheet fabrication machines, some of which may be adapted to use the process as disclosed in the instant invention.
Figure 2:
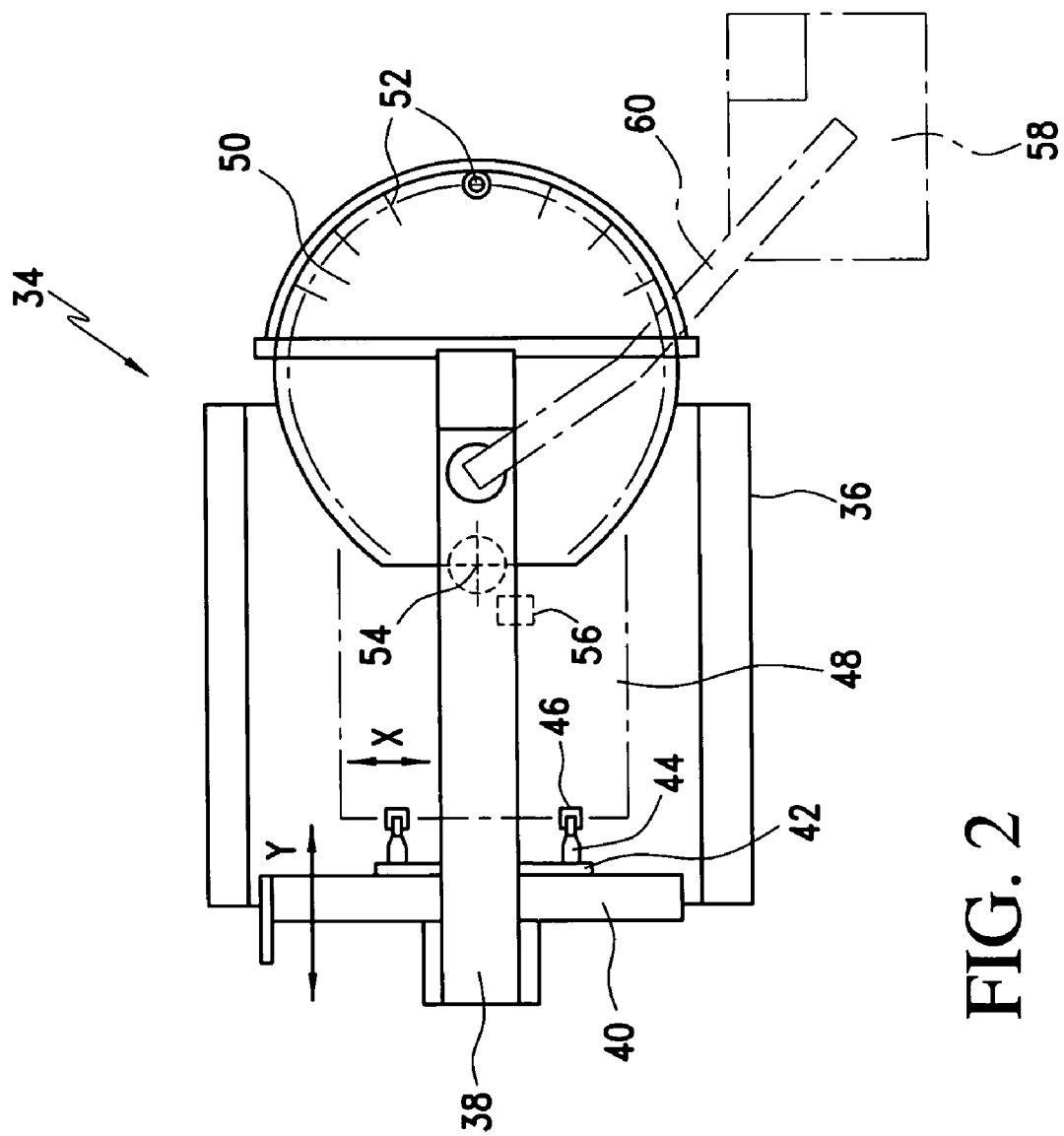
FIG. 2 is a plan view of a sheet fabrication machine, in this instance a turret punch press which may utilize the inventive method of the instant invention.

With reference to FIG. 1, a flexible manufacturing system such as for example the Finn-Power FMS is shown. In particular, such flexible manufacturing system includes, among other components, an automatic storage system 2 in which sheet blanks or worksheets of various dimensions, sizes and characteristics are stored. These various worksheets are shown to be stored in a number of shelves 4a to 4d that could be manipulated to be aligned co-planarly with a conveyor system 6 that transports a sheet placed thereon to a loading system 8. The worksheet is picked-up by a loading mechanism and further transported to a machine center 12, which may comprise, among other machines, a turret punch press where multiple different tools are used to fabricate different holes or openings on the worksheet. The plan view of such turret punch press is shown in FIG. 2. Adjacent to the turret punch press and residing at the machine center 12 may be a right-angle shear machine 14 for cutting pieces from the worksheet. The respective operations of the storage system 2, the loading system 8, the turret punch press and the right-angle shears are controlled by a numerical controller 16. Further controlled by controller 16 are an unloading arm system 18, an unloading/sorting device 20, an unloading/sorting conveyor system 22 and a stacker/unloading system 24. At least one storage bin 26 is provided by multi-sectioned conveyor 20 for depositing cut pieces. A number of storage bins 28 are placed under the respective sections of conveyor 22 for receiving cut pieces. There is also a cassette 30 onto which a plurality of pellets 32 are placed. Cassette 30 is equipped with rollers that allow it to be positioned underneath the stacking mechanism of stacker-unloader system 24, so that cut pieces of different sizes may be placed onto the different pallets. A more detailed description of the flexible manufacturing system of FIG. 1 is provided in U.S. Pat. No. 6,788,995, assigned to the same assignee as the instant application. The disclosure of the '995 patent is incorporated by reference herein.

FIG. 2 shows a sheet fabrication machine for example a turret punch press 34 that is a part of the flexible manufacturing system of FIG. 1 and to which the inventive method is applicable. Turret punch press 34 has a base frame that includes a worktable 36. A top frame 38 is mounted to the base of the machine. Movably mounted to the base frame is a first carriage 40 which is movable along the directions indicated by the y directional arrows. Movably mounted to carriage 40 is a second carriage 42 which is movable along the first carriage 40 in the directions as indicated by directional arrows x. Two or more grippers 44 are shown to be connected to second carriage 42, as taught in U.S. Pat. No. 4,658,682, the disclosure of which being incorporated by reference herein. Each of the grippers 44 has a pair of jaws 46 for grasping a worksheet 48.

As is well known, a turret 50 is rotatably mounted to top frame 38. A number of tools exemplified by tools 52 are mounted to the periphery of turret 50. Turret 50 is rotatable about a center axis such that each of the tools movably fitted at its periphery can be positioned under a puncher or ram at location 54 for effecting a hole, or an opening onto worksheet 48. As first carriage 40 is movable along the y axis and second carriage 42 is movable along the x axis, worksheet 48 can be moved anywhere on table 36 via a combination of movements of carriage 40 and 42 so that selective areas of worksheet 48 may be moved to location 54 on table 36 for fabrication by the tool thereat. For the instant invention, a sensor 56 may be provided at a location proximate to position 54, in order to sense or measure the tool that is being used for fabricating the worksheet. One of the parameters that is being measured by sensor 56 is the grind life of the tool, i.e., the wear and work length remaining on the tool during and after the use of the tool on the worksheet.

The operation of the sheet fabrication machine 34 shown in FIG. 2 is controlled by a computerized numerical controller (CNC) 58, which is connected to machine 34 by cables through a conduit 60.

Figure 3:
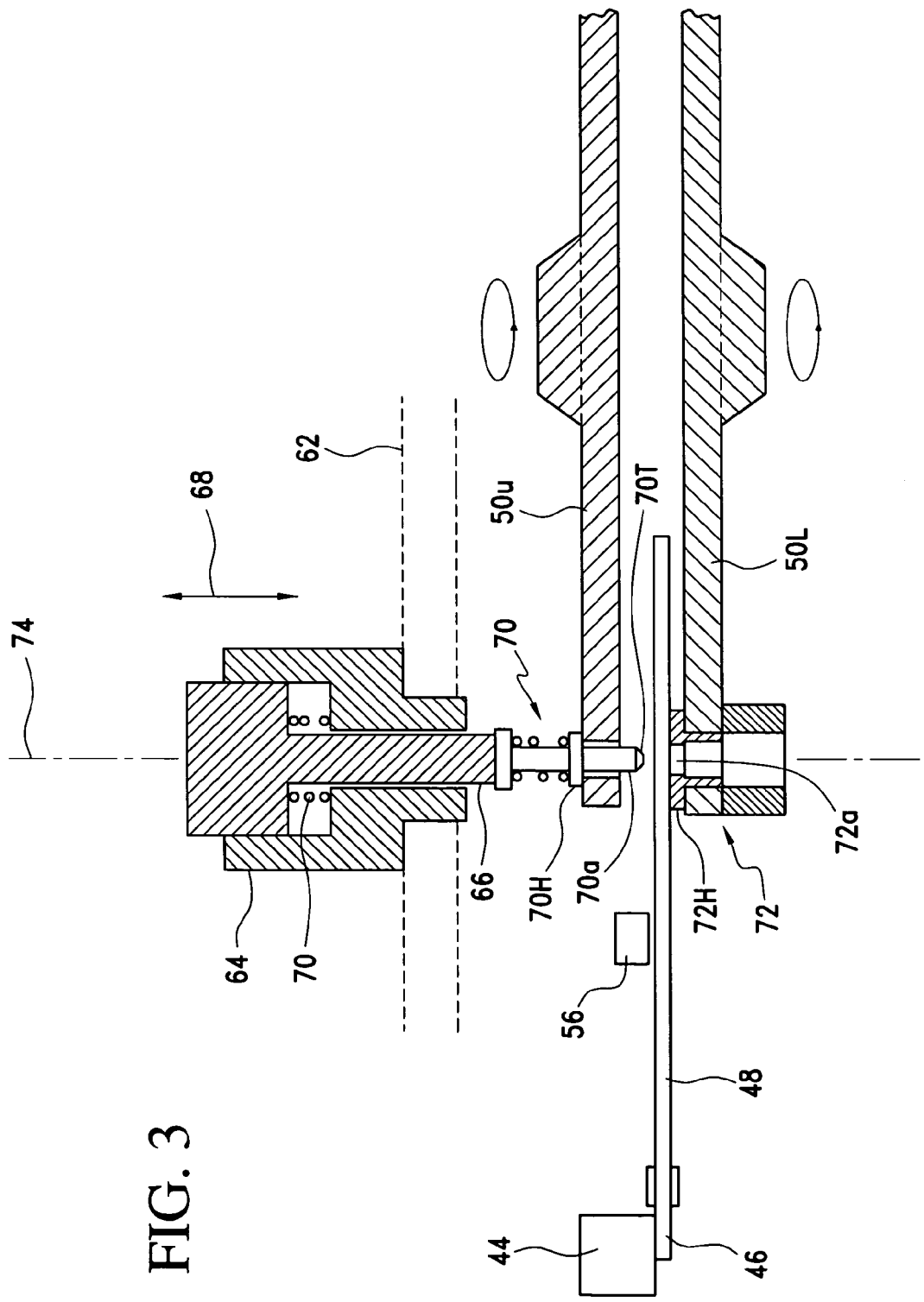
FIG. 3 is a semi-cross-sectional view of the tool, its die, and the worksheet to be fabricated by the tool for illustrating the principle of the instant invention method.

FIG. 3 illustrates in more detail the interaction of the tool and the worksheet of the inventive system. As shown, attached to a frame 62 of machine 34 is a ram 64, which may be driven by hydraulics or an electrical mechanical driving mechanism (not shown). Ram 64 includes a drive shaft 66 that, when driven either hydraulically or electro mechanically, is movable along the directions as indicated by directional arrows 68. A spring mechanism 70 in the chamber of the drive mechanism returns the ram to its non-punching position, when it is not driven in the downward direction.

A punch or tool 70 in the form of an assembly is mounted to the periphery of the upper turret 50u of machine 34, so that tool 70 may be driven in the downward direction, as indicated by the downward direction of directional arrows 68 to act against worksheet 48, which is held by clamps 46. A corresponding die 72, which may be considered a part of the tool assembly, is mounted to the periphery of a lower turret 50l so that it is in alignment along the longitudinal axis 74 of tool 70. As shown, die 72 has an opening 72a that has a diameter that is larger than the diameter of the punch portion 70a of tool 70. The difference between the diameter of opening 72a and the diameter of punch portion 70a is considered the clearance, which is necessary for allowing punch portion 70a of the tool to effect a hole in sheet 48, i.e., effecting fabrication on worksheet 48.

As further shown, tool 70 has a worksheet interact or tip portion 70t that actually comes into contact with worksheet 48. As it repeatedly acts on worksheet 48, tip 70t tends to wear out. Thus, if the punch portion 70a of tool 70 is worn out to such an extent, when it is driven by ram shaft 66 to act on worksheet 48, and it no longer has the grind life or work length which allows it to punch through worksheet 48 with the appropriate clearance, not only would worksheet 48 not be punched properly, the interaction of worksheet 48 and punch portion 70a may well cause damage to punch holder 70h, and also possibly die 72 and its die holder 72h, as punch portion 70a is being retracted.

As noted earlier, a sensor 56, which may be mounted to a portion of the frame, is used in the instant invention for monitoring the wear and tear, i.e., the grind life of the tool 70, particularly punch portion 70a and tip 70t thereof. Sensor 56 may either be a magnetic sensor, a mechanical sensor or an electronic sensor, a number of which are disclosed in U.S. Pat. No. 6,041,271, assigned to the same assignee as the instant invention. The disclosure of the '271 patent is hereby incorporated by reference.

Figure 4:
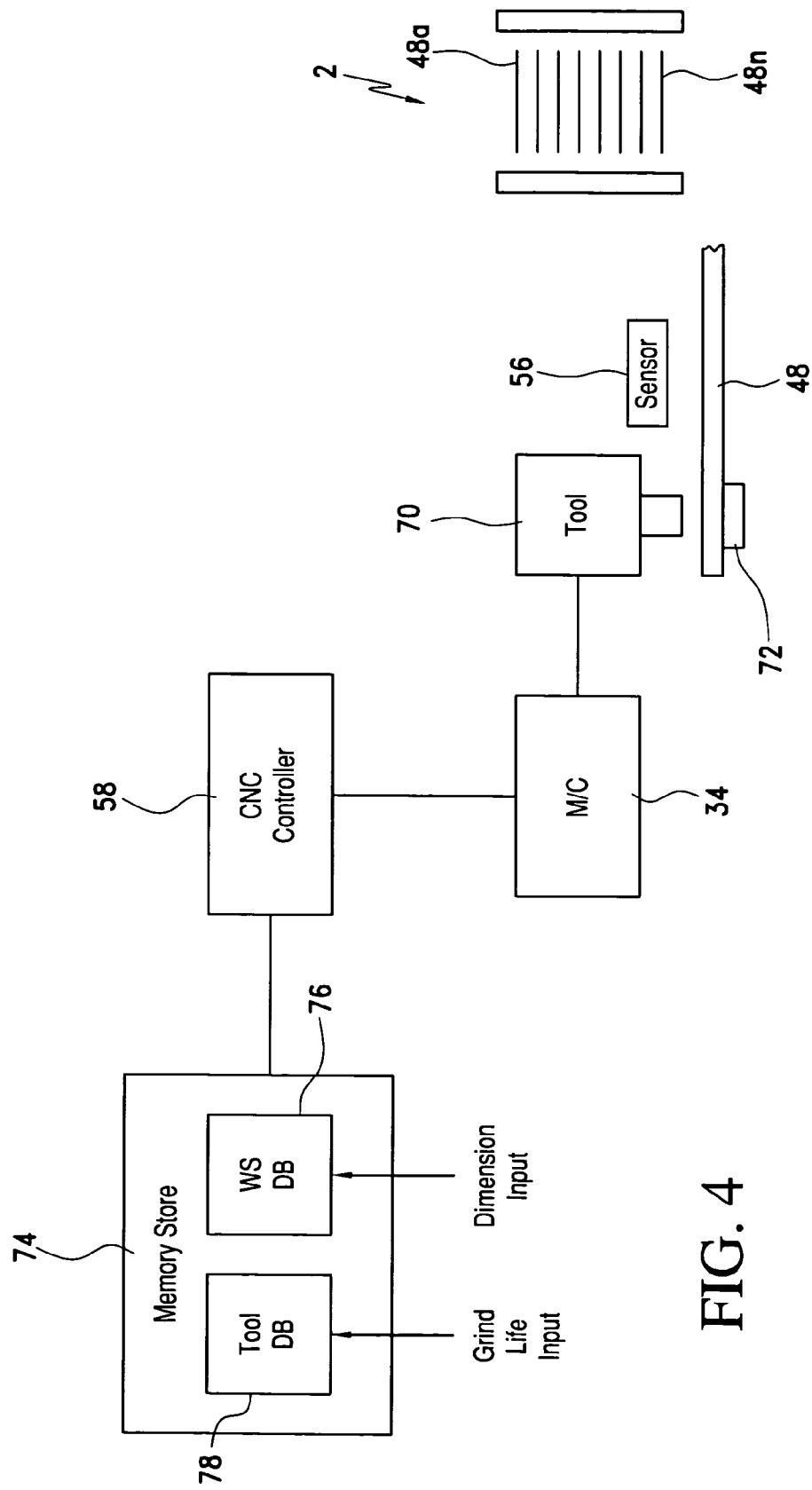
FIG. 4 shows in block diagram form the various components of the instant invention.

To ensure that punch 70 has sufficient grind life to fabricate a worksheet, irrespective of the thickness or dimension of the worksheet, the machine of the instant invention, in addition to sensor 56, has incorporated to its memory store 74 a worksheet database 76 and a tool database 78, as shown in FIG. 4. As further shown in FIG. 4, memory 74 is connected to the CNC controller 58, which in turn is connected to machine 34 for controlling the operation of tool 70, with reference to its die 72. Also shown in FIG. 4 is storage system 2 having stored therein multiple worksheets 47a to 48n, representing worksheets of different dimensions and thicknesses, as well as hardnesses. Each of tool database 78 and worksheet database 76 has an input, indicated by grind life input and dimension input, respectively. The inputs to the databases may be by means of keyboards, diskettes, files and other input means that are conventionally known.

The information in regard to the different worksheets stored in worksheet database 76 include the different dimensions of the worksheets which include the x and y lengths, as well as the thickness of each worksheet. Also included are the characteristics of the different worksheets including for example the hardness of each worksheet which may be determined by the type of material and/or the percentage of steel composition of the worksheet.

Some of the data that are stored in the tool database are shown in FIG. 5. In particular, the data produced by the different manufacturers with respect to their different tools are input to the tool database 78. For the exemplar data of FIG. 5, there are five manufacturers indicated by "Mate" and "M2-M5". Tool 1 for example shows that it has an x dimension of 0.5, a y direction of 0.5 and a z dimension of 0. The dimension for the tools in this instance may be represented by centimeters. In regard to tool 1, and also exemplar tools 2-5, three different dies are available for use therewith. For example, tool 1 may be used with any one of the three dies—with die 1 having a clearance of 0.01, die 2 a clearance of 0.02, and die 3 a clearance of 0.05. Thus, worksheets having respective thicknesses relative to the clearances indicated by dies 1-3 may be fabricated by tool 1, provided that tool one has a grind life remaining that could penetrate the material thickness.

Also stored in the tool database 78 are the appropriate hovering heights for the different tools of the machine. An appropriate hovering height for a given tool is necessary in order to provide the proper clearance between the tool and the die for a worksheet of a given material thickness.

In FIG. 5, exemplar tool 1 is shown to have 0.175, for example 0.175 centimeter, grind life remaining at its punch portion, or more specifically its punch tip 70t as indicated in FIG. 3. Thus, for tool 1, assuming that the only die clearance available for use therewith is die 1, which has a value of 0.01, tool 1 can only be used for fabricating a worksheet that has a thickness that would allow a clearance of 0.01, as there continues to be sufficient grind life remaining for tool to fabricate a worksheet having a thickness that would allow for a clearance of 0.01. As tool 1 has the same x and y dimensions, the hole punched onto the worksheet by the use of tool 1 is a square hole.

Each time that a tool is used, with sensor 56, the grind life remaining for the tool can be monitored. Thus, after each use of the tool, the remaining grind life as detected by sensor 56 may be input to tool database 78 for updating the grind life remaining for that tool. Alternatively, the grind life of the tool may be measured manually, for example when the fabrication of the worksheet is finished. At that time, the operator may remove the tool from the tool holder and physically measure the remaining length and wear of the tool. The measured information may then be input to the tool database per for example a keyboard. Although only five different tools are shown in FIG. 5, it should be appreciated that substantially more tools are in actuality stored in tool database 78. Moreover, each of the manufacturers may in fact produce a number of different tools with different grind lives. Indeed, the same tool produced by different manufacturers may have different grind lives.

With the grind life remaining on each of the tools available for use in the machine being constantly updated, information on all of tools are always available to the CNC controller for use with the particular machine, for example the turret punch press shown in FIG. 2. With updated knowledge of the grind life of the tool and also the die clearances available for use with the tool, an accurate determination of whether a tool may be used to fabricate a worksheet having a given thickness is readily determined and the use of a tool not adaptable to work on a given worksheet can be readily prevented.

Thus, when an operator has chosen a wrong tool or die clearance to fabricate a worksheet having a particular material thickness, by way of warning mechanisms such as for example a warning sound possibly coupled with a warning display at the controller display module, the operator is warned that the particular worksheet should not be worked with the particular tool and/or die that he has chosen. The operator may be given the option of overriding the warning. However, such warning override is recorded for later analysis, as a wrong clearance between the punch and die might well cause problems in stripping the punch out from the worksheet and also may cause worksheet crashes that could result in loss production material and time.

Per the instant invention, given that the remaining grind life of a tool is continually known, even though a particular tool may not be effective for fabricating a worksheet for a given thickness, that tool may in fact be available for use for worksheets that have thicknesses that are thinner than the worksheet for which proper clearance could not be obtained. Thus, a tool that otherwise would have been disposed of prior to the instant invention may actually be flagged in the tool database, so as to be retained or reserved for use with other worksheets. Thus, the respective useful lives of the tools available for use with the machine are extended.

Figure 5A:
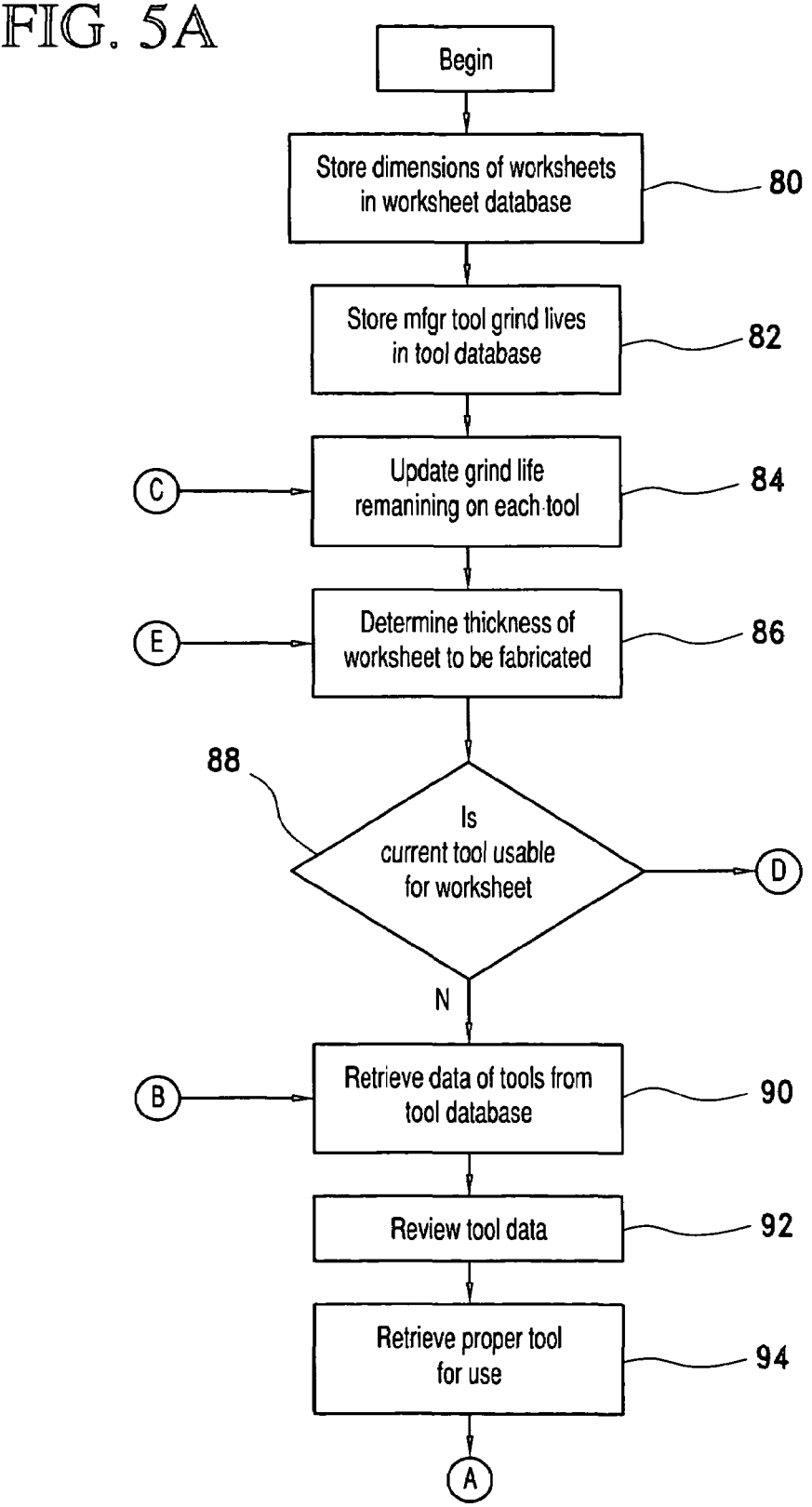
FIGS. 5a and 5b together form a flow chart that illustrates the processing steps of the method of the instant invention.
Figure 5B:
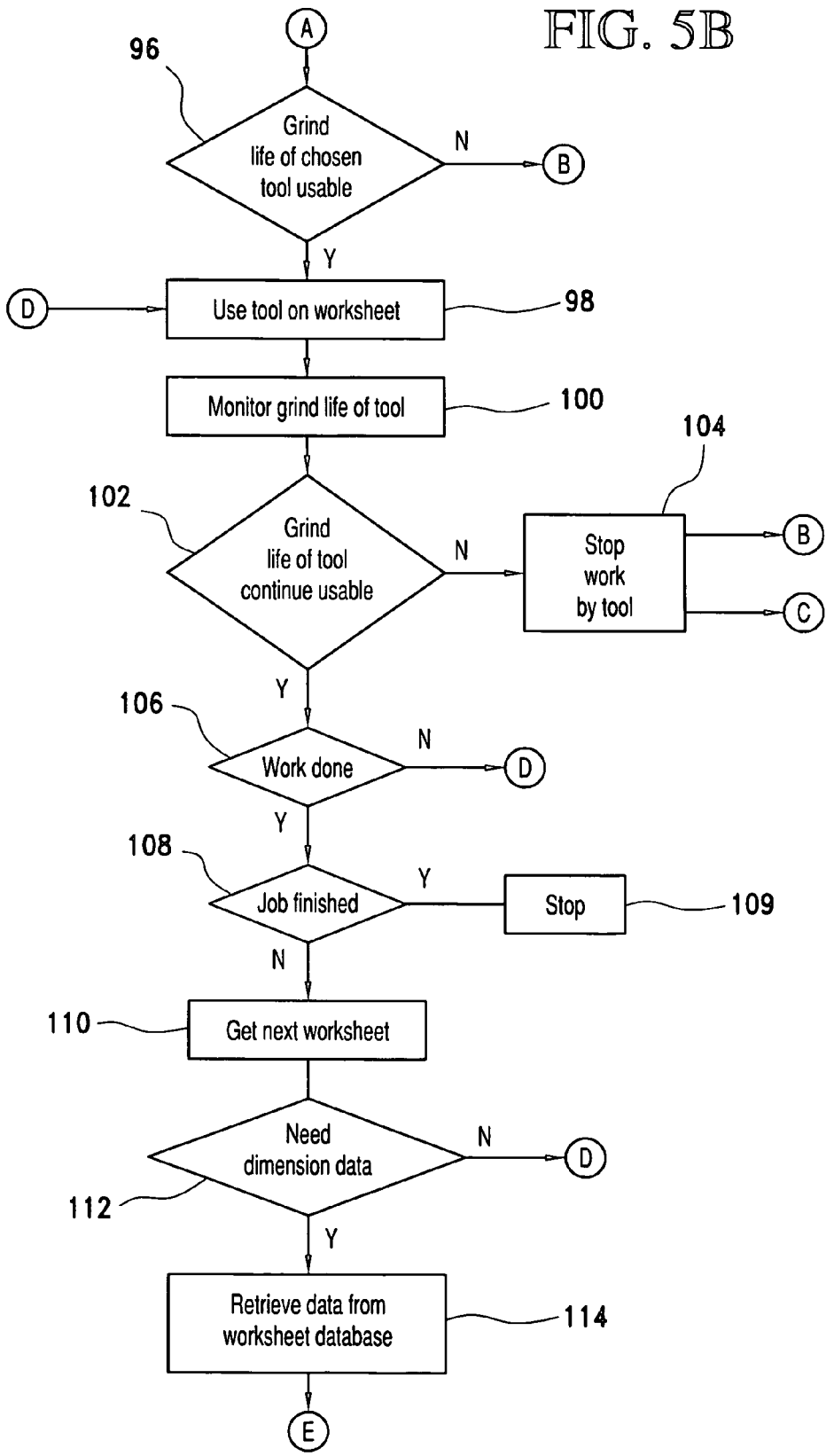

A flowchart illustrating the operation of the method of the instant invention is given in FIGS. 5a and 5b. The process begins with the storing of information relating the dimensions of the worksheets in the worksheet database 76, as indicated in step 80. At the same time, or prior to or after step 80, the different grind lives of the tools provided by the manufacturers of those tools, as well as other data relating to those tools, are stored in the tool database 78, as indicated in step 82. The grind life on each of the tools, as that tool is being used and/or finishes its work on a particular sheet, is measured and updated to the tool database, per step 84. As mentioned previously, the measuring of the grind life of each tool may be done automatically by an appropriate sensing means such as sensor 56, or manually by the operator at the end of the production run for that tool.

At step 86, a determination is made on the thickness of the worksheet that is to be fabricated. This includes determining the clearance that is necessary for successfully fabricating the worksheet with the available tool and its corresponding die. A determination is then made per decision step 88 on whether the tool currently selected for use on the given worksheet is usable for the worksheet. If it is, then processing of the worksheet begins. On the other hand, if it is determined that the tool in the tool assembly for fabricating the worksheet should not be used, then the data for the different tools is retrieved from the tool database, per step 90. A review of the tool data then takes place at step 92, and the appropriate or proper tool with a resulting proper clearance for the given worksheet is then retrieved and located at the work position for fabricating the worksheet, as indicated in step 94. A further determination is then made on whether the grind life of the chosen tool is usable for fabricating the given worksheet, per step 96. If it is, the machine proceeds to use that tool to fabricate the given worksheet, per step 98. On the other hand, if it is determined that the grind life of the chosen tool is not adequate for working on that given worksheet, the process returns to step 90 so that additional data is retrieved from the tool database for determining further whether some other tools may be available for use.

As the worksheet is being fabricated by a selected tool, the grind life of the tool is monitored, either automatically by a sensor mechanism, or at the end of the fabrication of the worksheet by the operator, per step 100. A determination is then made on whether the grind life of the tool continues to be usable, per step 102. If it no longer is, then the fabrication of the worksheet by that tool is stopped, per step 104. The process then returns to step 90 for retrieving data of the other tools that are available in the machine for use, and also step 84 to update the grind life that is remaining on the tool that no longer is usable with that given worksheet, in the event that there are other worksheets to which that particular tool may still be usable for.

If the grind life of the tool continues to be usable for a given worksheet as determined in step 102, then at step 106 a determination is made on whether the work is done. If it is not, the fabrication of the worksheet continues. If the work indeed is done, then a determination is made on whether the job of fabricating worksheets of the same thickness is done. If it is, the process stops at step 109. If not, a worksheet of the same thickness that is part of the same batch of worksheets of the same thickness is retrieved, as for example at worksheet storage system 2, for processing per step 110. To ensure proper processing, a determination is made in step 112 on whether dimensional data relating to the worksheet is needed. If it is not, the fabrication of the worksheet proceeds. If there is a need, then the appropriate data is retrieved from the worksheet database, per step 114. Thereafter, the thickness and other characteristics of the worksheet are determined, per step 86.

With the method of the instant invention, the appropriate tool for working on a given worksheet is provided. Moreover, if a tool is determined not to be usable for a given worksheet, that tool is flagged, per an indication for that tool in the tool database, so that the use of that tool may be reserved for use on worksheets that have a material thickness that is thinner than the material thickness of the given worksheet to thereby extend the useful life of the tool. And with the measuring, either automatically or manually, of the unused portion of each tool and corresponding the unused portion of the tool with the grind life remaining on the tool, the grind life remaining for the tool may be updated in the tool database. Further, with the hovering height that is appropriate for each tool being stored in the tool database, the proper clearance is provided between each of the tool and its corresponding die so that a worksheet of a given thickness, or worksheets having thicknesses that are thinner than the given worksheet, may all be successfully fabricated by the tool with the appropriate clearance.

The invention claimed is:

1. In a processor controlled sheet fabrication machine, a method of determining whether a tool can be used to work on worksheets of different thicknesses, comprising the steps of:

a) storing in a tool database the respective manufacturer designated grind lives for the tools to be used by the machine;

b) storing in a worksheet database the respective thicknesses of the worksheets to be fabricated by the machine;

c) updating the grind life remaining on each tool in the tool database by monitoring at least the portion of said each tool that interacts with worksheets after usage of said each tool;

d) wherein when a worksheet is to be worked on by said each tool, retrieving data relating to said each tool from said tool database and retrieving data relating to said worksheet from said worksheet database; and e) determining from the retrieved tool and worksheet data whether the grind life remaining on said each tool would allow said each tool to fabricate said worksheet.

2. Method of claim 1, wherein said step c comprises the steps of:

measuring the unused portion of said each tool that interacts with worksheets;

corresponding the unused portion of said each tool with the grind life remaining for said each tool; and updating the grind life remaining for said each tool in said tool database.

3. Method of claim 1, wherein if it is determined that the grind life remaining on said each tool does not allow said each tool to work on said worksheet, further comprising the steps of:

flagging said each tool in said tool database as a tool not adaptable to work on worksheets that have a material thickness that is the same as, or thicker than, said worksheet; and reserving said each tool for use on worksheets that have a material thickness that is thinner than the material thickness of said worksheet to thereby extend the useful life of said each tool.

4. Method of claim 1, wherein said step a comprises the step of storing in said tool database data relating to at least the respective x and y dimensions, penetration depths and hovering heights of the tools.

5. Method of claim 1, wherein said step b comprises the step of storing in said worksheet database data relating to at least the respective x and y dimensions and material thicknesses of the worksheets.

6. Method of claim 1, wherein if it is determined that the grind life remaining on said each tool does allow said each tool to work on said worksheet, said method further comprising the step of retracting said each tool to an appropriate hovering height for said each tool to provide the proper clearance between said each tool and its die so that said worksheet, or other worksheets having a material thickness substantially the same or thinner than said worksheet may be fabricated by said each tool and its die.

7. Method of claim 1, wherein said step a includes storing in said tool database the respective hovering heights of the tools relative to their dies, the method further comprising the step of:

determining from the hovering height of said each tool that proper clearance is provided between said each tool and its die for fabricating said worksheet.

8. In a processor controlled sheet fabrication machine, a method of picking an appropriate tool to work on a worksheet without causing damage to either the tool or the worksheet, comprising the steps of:

a) storing in a tool database the respective manufacturer designated grind lives for the tools to be used by the machine;

b) updating the grind life remaining on each tool in the tool database by directly monitoring at least the portion of said each tool that actually comes into contact with worksheets after usage of said each tool;

c) wherein when a worksheet of a given material thickness is to be fabricated, retrieving data relating to the respective grind lives of the tools from said tool database and determining from the retrieved data whether there is at least one tool having a grind life remaining that would successfully fabricate said worksheet without causing damage to either said one tool or said worksheet; and d) selecting said one tool to fabricate said worksheet if said one tool is available.

9. Method of claim 8, further comprising the steps of:

storing in a worksheet database the respective material thicknesses of a plurality of worksheets;

analyzing the respective tool grind lives of the tools and the respective worksheet material thicknesses of the worksheets to match worksheets of different material thicknesses with corresponding tools so that selective ones of the tools may be used to fabricate corresponding ones of the worksheets.

10. Method of claim 8, wherein said step b comprises the steps of:

measuring the unused portion of said one tool;

corresponding the unused portion of said one tool with the grind life remaining for said one tool; and updating the grind life remaining for said one tool in said tool database.

11. Method of claim 8, wherein if it is determined that the grind life remaining on a tool does not allow said tool to fabricate a particular worksheet, further comprising the steps of:

flagging said tool in said tool database as a tool not adaptable to work on worksheets that have a material thickness that is the same as, or thicker than, said particular worksheet; and reserving said tool for use on worksheets that have a material thickness that is thinner than the material thickness of said particular worksheet to thereby extend the useful life of said tool.

12. Method of claim 8, wherein said step a comprises the step of storing in said tool database data relating to at least the respective x and y dimensions, penetration depths and hovering heights of the tools.

13. Method of claim 8, wherein if it is determined that the grind life remaining on said one tool does allow said one tool to work on said worksheet, said method further comprising the step of retracting said one tool to an appropriate hovering height to provide the proper clearance between said one tool and its die so that said worksheet, or other worksheets having a material thickness substantially the same or thinner than said worksheet may be fabricated by said one tool and its die.

14. Method of claim 8, wherein said step a includes storing in said tool database the respective hovering heights of the tools relative to their dies, the method further comprising the step of:

determining from the hovering height of said one tool that proper clearance is provided between said one tool and its die for fabricating said worksheet.

15. A sheet fabrication machine, comprising:

a plurality of worksheets;

a plurality of tools each adapted to be used by the machine to fabricate selected worksheets;

a tool database for storing grind lives for the tools, said grind lives corresponding at least to the portion of each of said tools that interacts with worksheets, the grind life of the portion of each of said tools being measured after each usage and updated in said tool database;

a worksheet database for storing at least the respective material thicknesses of the worksheets; and a processor for determining from data stored in said worksheet and tool databases if a tool chosen to work on a worksheet of a given material thickness has a remaining grind life that enables it to successfully fabricate said worksheet.

16. Machine of claim 15, further comprising:
a sensor for measuring the grind life on each tool after usage of said each tool; and
means for inputting the measured grind life for said each tool into the tool database to update the grind life remaining for said each tool.

17. Machine of claim 15, wherein said processor determines whether said tool could successfully fabricate said worksheet by looking at at least the material thickness of said worksheet to be worked on by said tool and the penetration length remaining on said tool, and whether said penetration length exceeds the material thickness of said worksheet.

18. Machine of claim 15, wherein if it is determined that the grind life remaining on a tool does not allow said tool to fabricate said worksheet, said processor reserves said tool for use only on worksheets that have a material thickness that is thinner than the material thickness of said worksheet to thereby extend the useful life of said each tool.

19. Machine of claim 15, wherein said tool database further has stored therein the appropriate hovering height of said tool relative to its die, said tool being retracted to the appropriate hovering height for fabrication of said worksheet so that proper clearance is provided for said worksheet, or other worksheets having a material thickness substantially the same or thinner than said worksheet if it is determined that the grind life remaining on said tool does allow said tool to work on said worksheet.

20. In a processor controlled sheet fabrication machine having a plurality of worksheets and a plurality of tools to work on the worksheets, a method of matching a tool with a worksheet for fabricating the worksheet, comprising the steps of:
a) storing in a tool database the respective manufacturer designated grind lives for the plurality of tools;
b) updating the grind life remaining on each of the plurality of tools in the tool database by directly monitoring at least the portion of said each tool that actually comes into contact with worksheets after usage of said each tool; and
c) wherein when a worksheet of a given material thickness is to be fabricated, reviewing the data relating to the respective grind lives of said plurality of tools from said tool database and selecting one tool from among the plurality of tools having a grind life remaining that allows said one tool to fabricate said worksheet without causing damage to either said one tool or said worksheet.

21. Method of claim 20, further comprising the steps of:
storing in a worksheet database the respective material thicknesses of the worksheets that may be fabricated by the machine;
retrieving data relating to the tools and the worksheets from said tool and worksheet databases; and
analyzing the retrieved data to determine respective appropriate tools for fabricating the different worksheets.

22. Method of claim 20, wherein if it is determined that the grind life remaining on a tool does not allow said tool to fabricate a particular worksheet, further comprising the steps of:
flagging said tool in said tool database as a tool not adaptable to work on worksheets that have a material thickness that is the same as, or thicker than, said particular worksheet; and
reserving said tool for use on worksheets that have a material thickness that is thinner than the material thickness of said particular worksheet to thereby extend the useful life of said each tool.

23. Method of claim 20, further comprising the step of retracting said one tool to an appropriate hovering height to provide the proper clearance between said one tool and its die so that said worksheet, or other worksheets having a material thickness substantially the same or thinner than said worksheet, is movable between said each tool and its die during fabrication thereof.

* * * * *